United States Patent
Fragnito

Patent Number: 5,413,011
Date of Patent: May 9, 1995

[54] POSITIVE VARIABLE SPEED TRANSMISSION SYSTEM

[76] Inventor: Frank Fragnito, 11 Holmes Ave., North Babylon, N.Y. 11703

[21] Appl. No.: 58,210

[22] Filed: May 10, 1993

[51] Int. Cl.⁶ .......................................... F16H 21/12
[52] U.S. Cl. .................................... 74/63; 476/36; 476/38
[58] Field of Search ............... 74/63, 84 R, 112; 475/168; 476/36, 38

[56] References Cited

U.S. PATENT DOCUMENTS

| | | | |
|---|---|---|---|
| 950,055 | 2/1910 | Pusterla | 74/191 |
| 1,446,294 | 2/1923 | Healey | 74/64 |
| 1,870,875 | 8/1932 | Scheuer | 74/63 |
| 3,270,576 | 9/1966 | Goldwasser | 74/191 |
| 3,507,159 | 4/1970 | Batty | 74/63 |
| 3,807,243 | 4/1974 | Yada | 74/63 |
| 3,906,809 | 9/1975 | Erickson | 74/217 |
| 4,019,396 | 4/1977 | Frechette | 74/63 |
| 4,739,668 | 4/1988 | David | 74/63 |
| 4,875,389 | 10/1989 | Fragnito | 74/689 |
| 4,952,784 | 8/1990 | Pike | 74/63 |
| 4,960,003 | 10/1990 | Hartley | 74/63 |
| 5,016,487 | 5/1991 | Bollmann | 476/38 |
| 5,312,306 | 5/1994 | Folino | 476/36 |

Primary Examiner—Richard A. Bertsch
Assistant Examiner—Howard R. Richman
Attorney, Agent, or Firm—Stanley Ira Laughlin

[57] ABSTRACT

A positive, variable speed transmission system comprising a pair of beveled plates and a plurality of slidable balls which are moved between said plates, the position of said slidable balls determining the speed variation of said transmission system.

5 Claims, 8 Drawing Sheets

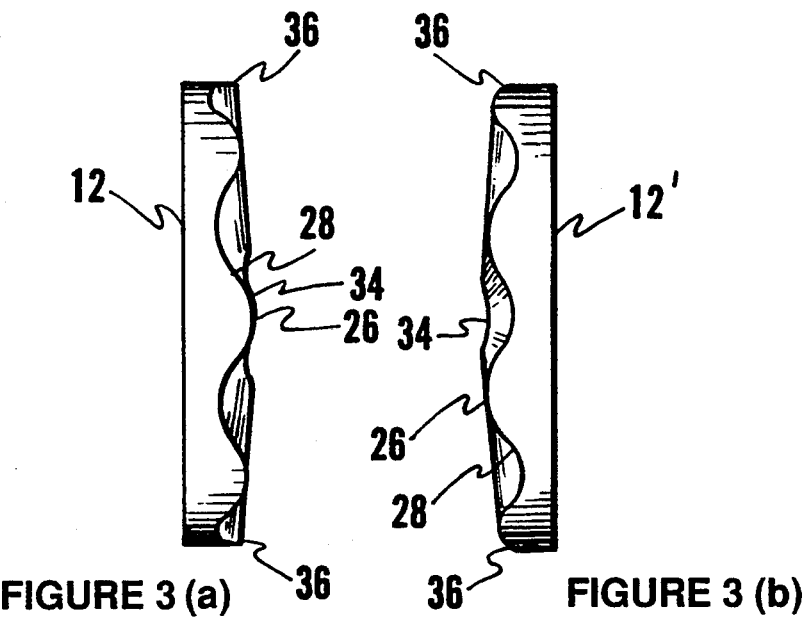
FIGURE 3 (a)  FIGURE 3 (b)
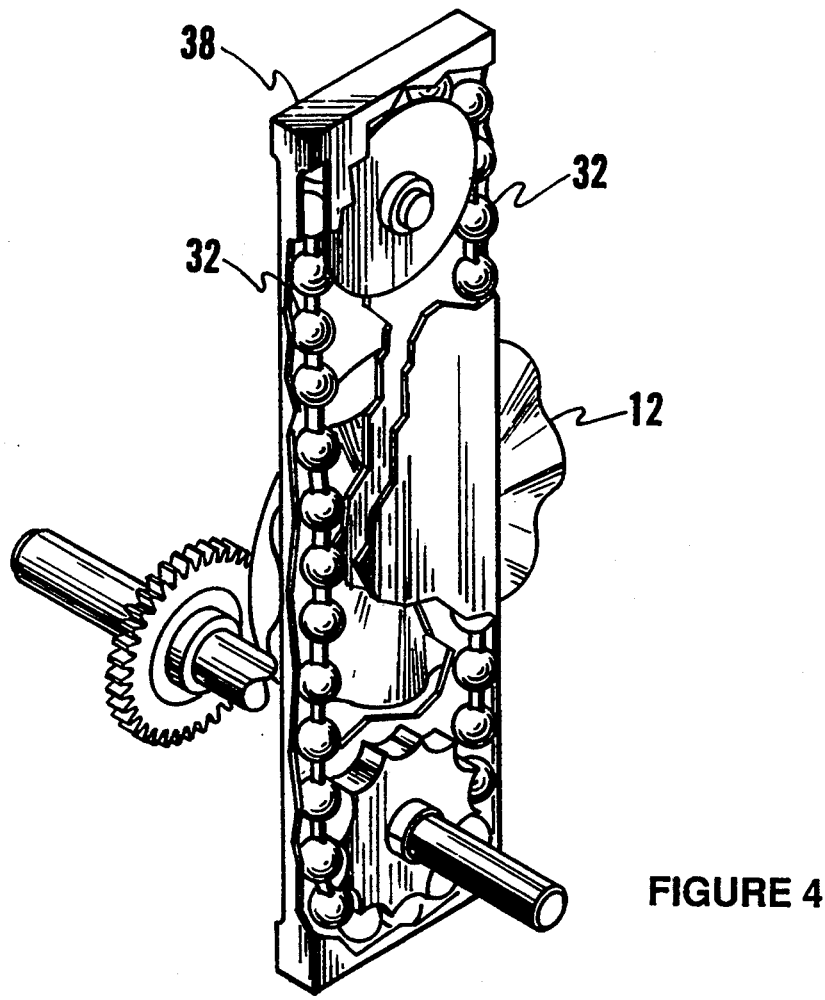
FIGURE 4

POSITIVE VARIABLE SPEED TRANSMISSION SYSTEM

BACKGROUND OF THE INVENTION

1. Technical Field

The invention relates to speed transmission systems for automobiles, trucks, and other machines requiring the input shaft speeds to be different from the output shaft speeds, and in particular positive variable speed transmissions.

2. Background Art

The art useful for the understanding, searching and examination of the invention is that of mechanisms and machine elements in general and more particularly positive variable speed changing mechanisms as classified in Class 74 subclasses 217, 230, 230.21, 244, 681 and 689.

3. Disclosure of the Invention

The invention improves the conventional speed transmission systems by the introduction of unique moving bevelled mating plates between input and output shafts. The plates, named as "Ruff Plates", have unique surfaces that determines the rotational speed of one shaft to the other by the positioning of a plurality of continuous series of spaced-apart interconnected balls between the plates. The plates are thicker in the center and decrease to practically zero thickness at the peripheral edges. The mating surfaces of the plates comprises concentric series of crests and valleys increasing from the center to the peripheral edges in aligned sectors that allow the balls to pass between.

SUMMARY OF THE INVENTION

Applicant's positive variable speed transmission system employs uniquely designed moveable plates whose mating surfaces of concentric crests and valleys aligned into sectors extending from the thin peripheral edges to the thicker center of the plates. A continuous chain of moving spread-apart balls which are positioned between the plates, and the plates are moved toward each other to determine the desired speeds of the output shaft relative to the input shaft.

It is an object of Applicant's invention to provide safe, simple and economical speed transmission systems.

It is a further object of Applicant's invention to provide reliable speed transmission systems.

It is yet a further object of Applicant's invention to provide unitary speed transmission systems that can be replaced without a great deal of fuss.

BRIEF DESCRIPTION OF THE DRAWINGS

FIGS. 3(a) and 3(b) are side elevation views of the two beveled plates shown in FIGS. 2(a) and 2(b).

FIG. 4 is an isometric drawing of Applicant's invention showing in more detail an embodiment of the structure containing a plurality of balls as shown in FIGS. 1(a) and 1(b).

DETAILED DESCRIPTION

Figure 1A:
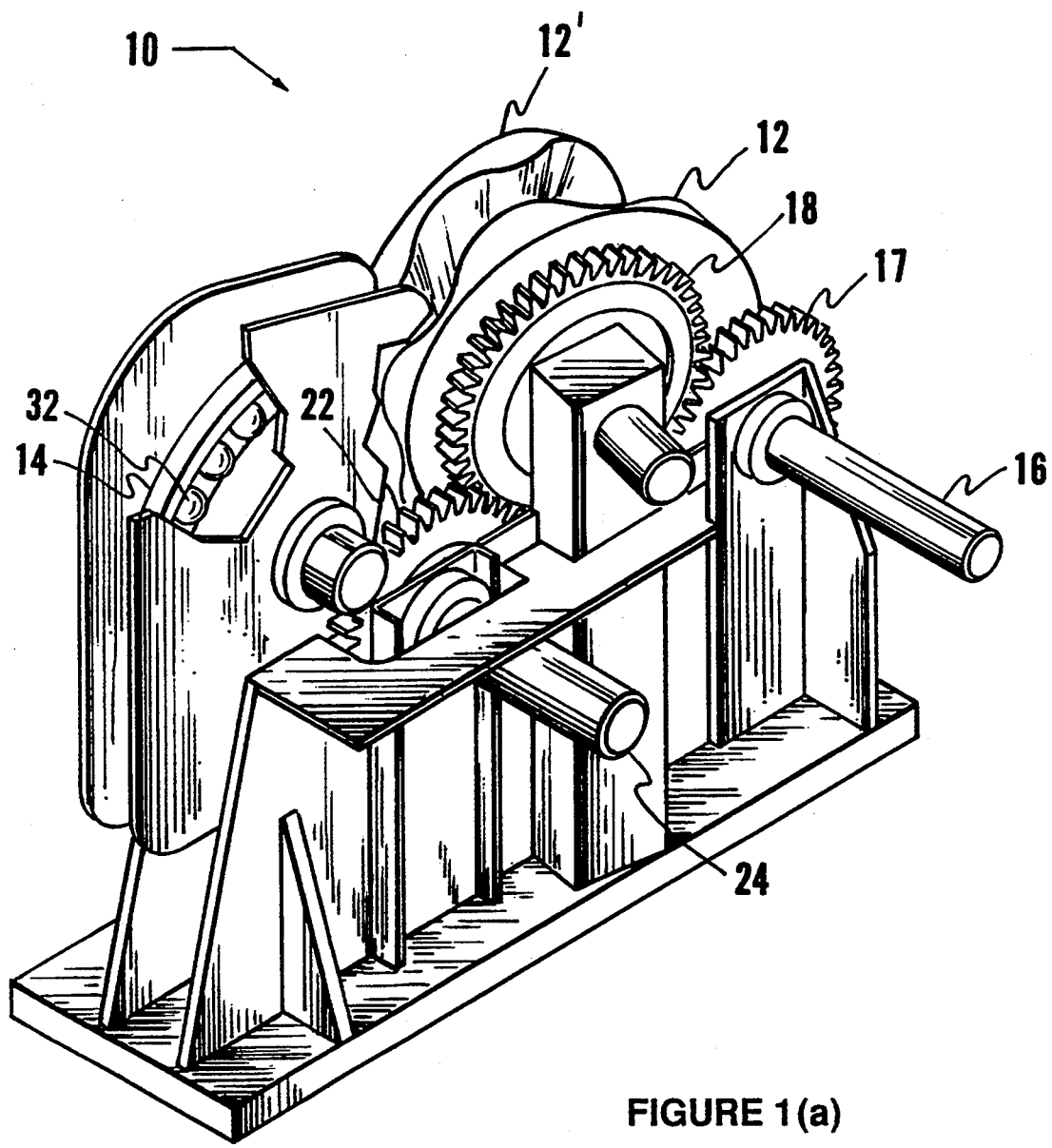
FIGS. 1(a) and 1(b) are front and rear isometric drawings of Applicant's invention.
Figure 1B:
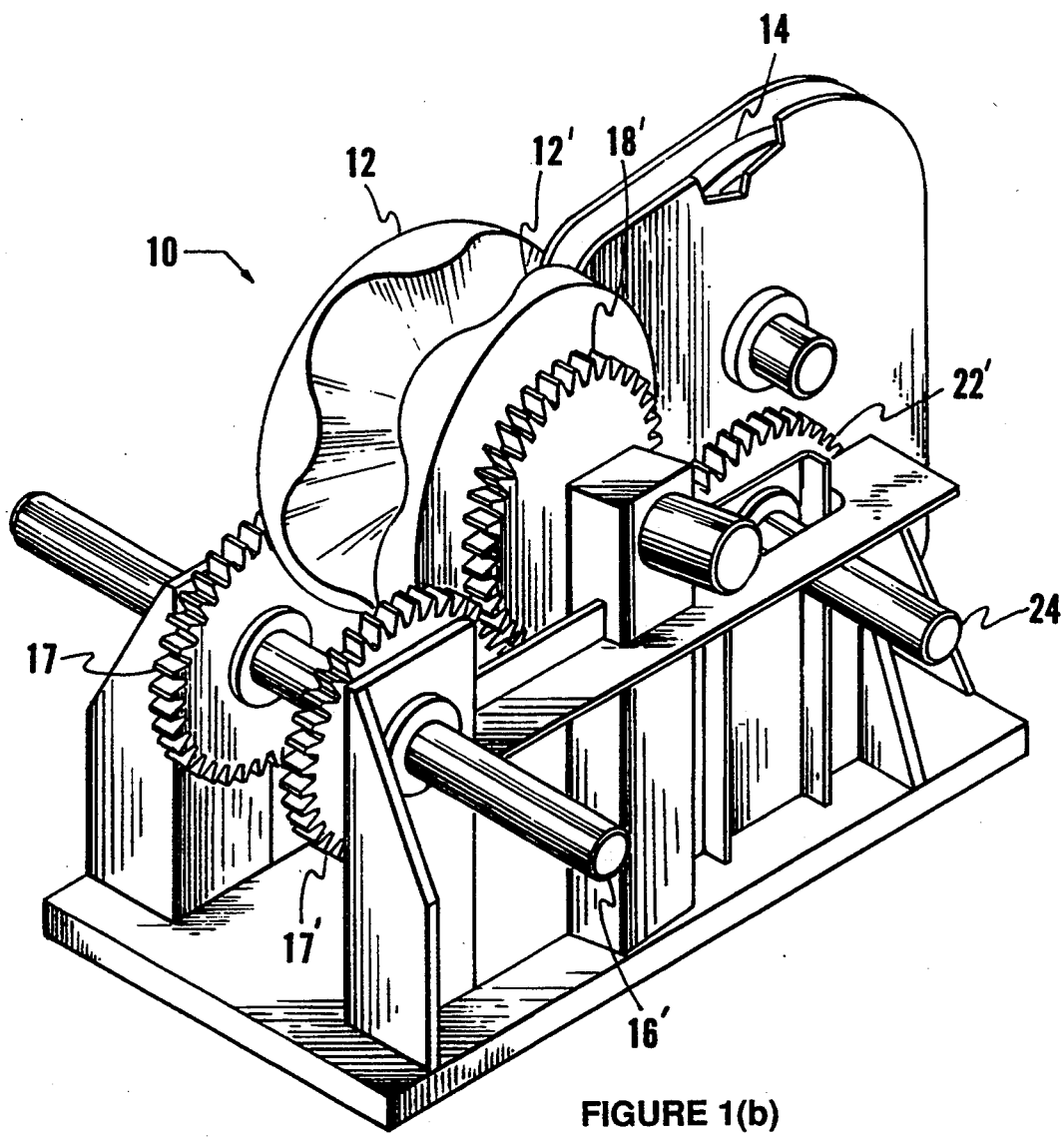
Figure 2B:
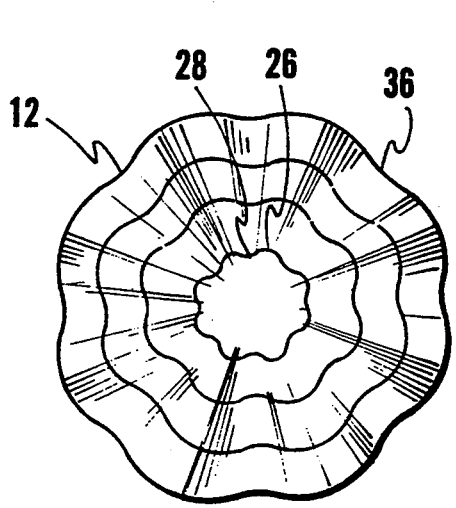
FIGS. 2(a) and 2(b) are detailed plan views of the mating surfaces of the two beveled plates shown in FIGS. 1(a) and 1(b) comprising Applicant's invention.
Figure 2A:
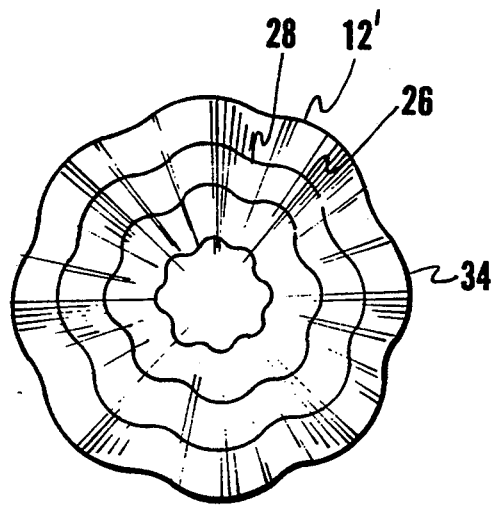

Applicant's positive variable speed transmission system 10 comprises using two beveled plates 12 and 12'having opposing mating surfaces with concentric continuous alternate crests 26 and valleys 28 extending outward from a high at the center of the plate to the lows at the outer edges of said plates in conjunction with a continuous number of balls 32 in a ball plate assembly 14. Referring to FIGS. 1(a) and 1(b), which are respectively front and rear isometric drawings of Applicant's invention, input shaft 16 is driven to rotate at a predetermined speed. Bevel plates 12 and 12' are connected to input shaft 16 through pinion gears 18 and 18' and rotates at speeds relative to the speed of the input shaft 16 determined by the diameters of the input shaft gears 17 and 17' and pinion gears 18 and 18'. By positioning the balls of ball plate assembly 14 at positions between the bevel plates 12 and 12', ball plate assembly 14 is capable of being rotated at various speeds relative to its position in the radius of bevel plates 12 and 12', which will determine the speed of output shaft 24 connected to output pinion gear 22. It is noted that either shaft may be the input or driving shaft, while the other the output or driven shaft. FIGS. 2(a), 2(b), 3(a), and 3(b) show the mating bevel plates 12 and 12' also known as "Ruff" plates in some detail, in front and side elevation views where it is shown that the crests 26 and valleys 28 extend from the relatively high elevation center 34 to the relatively low outer edge 36 of the plates, the distance between crests being smaller at the center and longer at the outer edge with the crests of one plate mating with the valleys of the other, but maintaining the same depth from the center to outer edge of the plate. Furthermore, the crest and valley sections of each plate as shown in FIGS. 2(a) and 2(b) progressively increasing from the center to the outer edge divide the surface area of each plate into pie-shaped sectors, which are wider at the outer edges and tapering at the center of each plate, which blend into each other from valley to crest forming a smooth surface. FIGS. 3(a) and 3(b) illustrates the mating of the crests of plate 12 with the valleys of opposite plate 12'. Other configurations, other than crests and valleys, such as grids although not illustrated, could be utilized in Applicant's invention.

Figure 5:
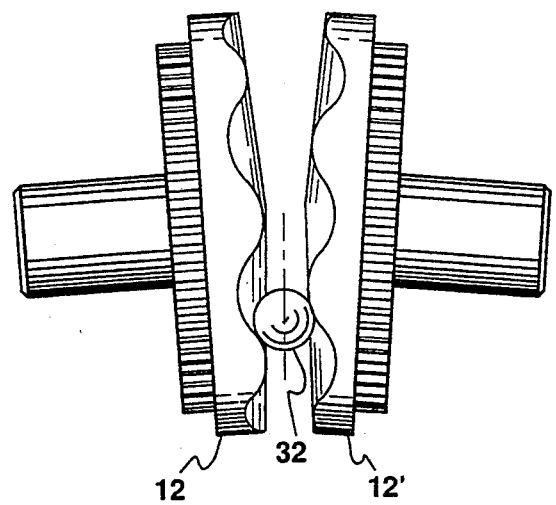
FIG. 5 is a detail drawing showing operation of a ball passing between mating beveled plates angled to illustrate a funnel effect
Figure 6:
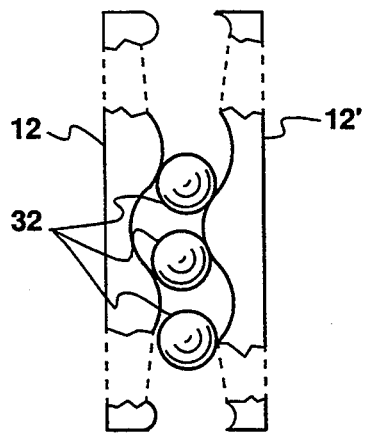
FIGS. 6(a), 6(b), 6(c) and 6(d) are detailed drawings showing operation of the plurality of balls as they pass between the mating beveled plates.
Figure 6:
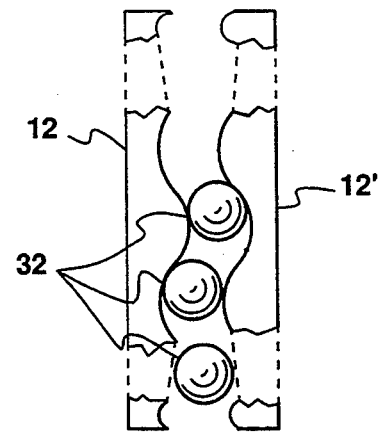
Figure 6:
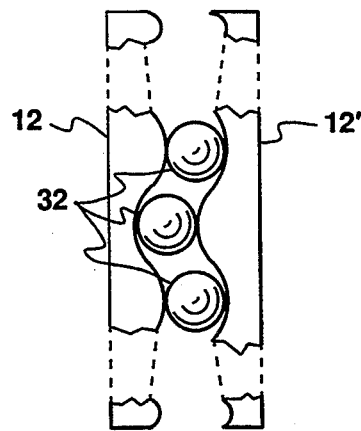
Figure 6:
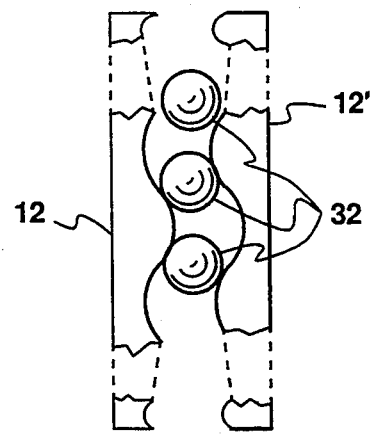
Figure 7:
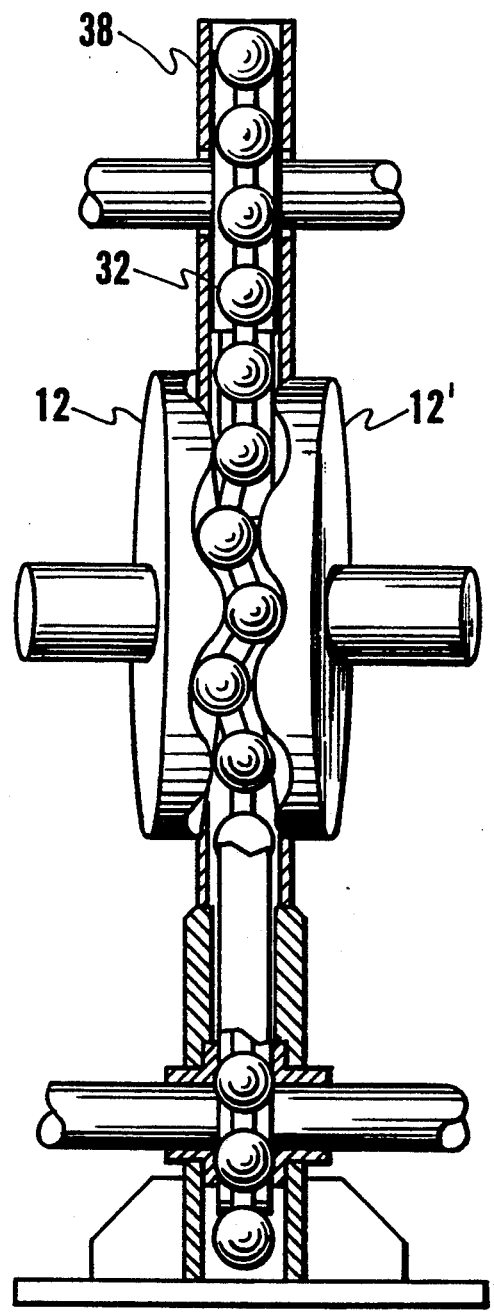
FIG. 7 is a detail drawing showing operation of a ball chain structure shown in FIG. 4.
Figure 8:
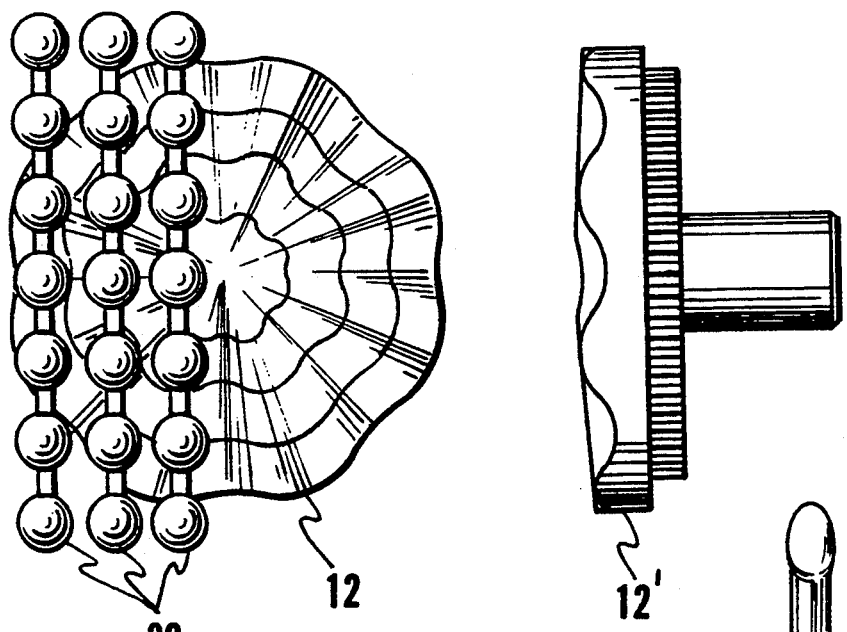
FIG. 8 illustrates the mechanical operation of speed changing by changing the position of the plurality of balls in Applicant's invention.
Figure 9:
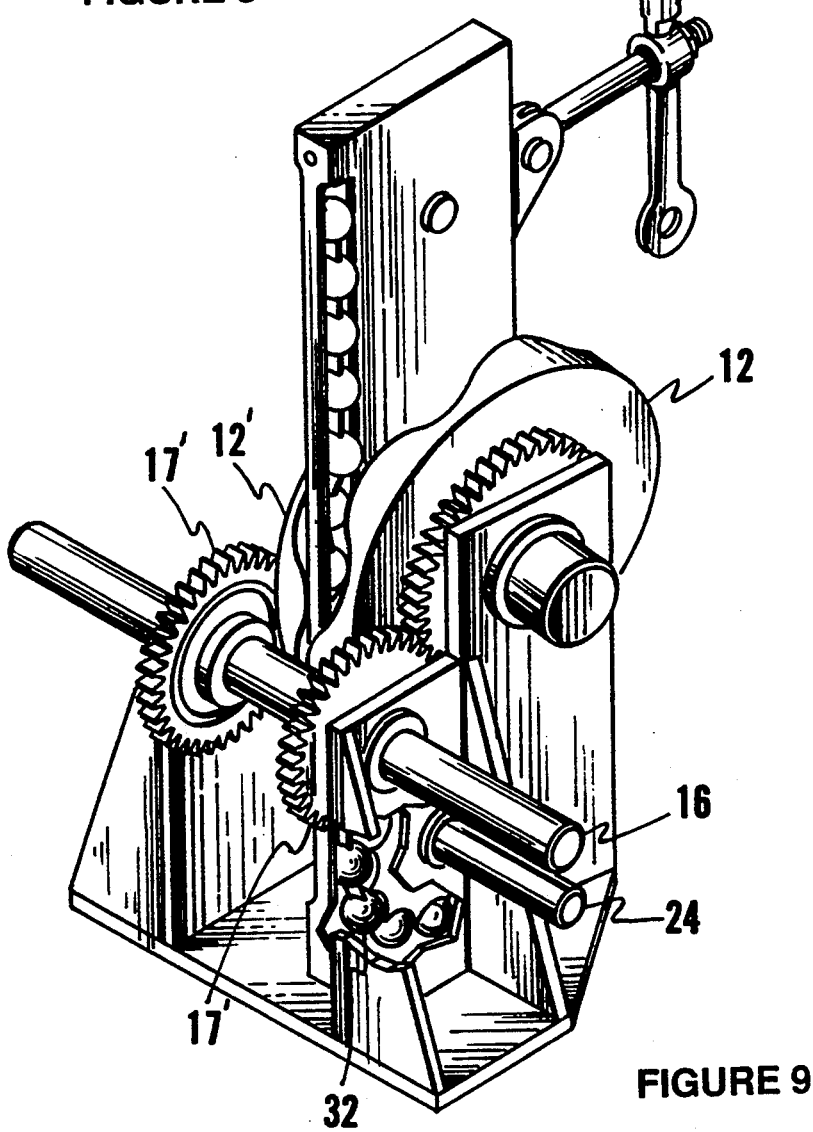
FIG. 9 is another embodiment of Applicant's invention showing an embodiment of the mechanism for changing the position of the plurality of balls illustrated in FIG. 8.
Figure 10:
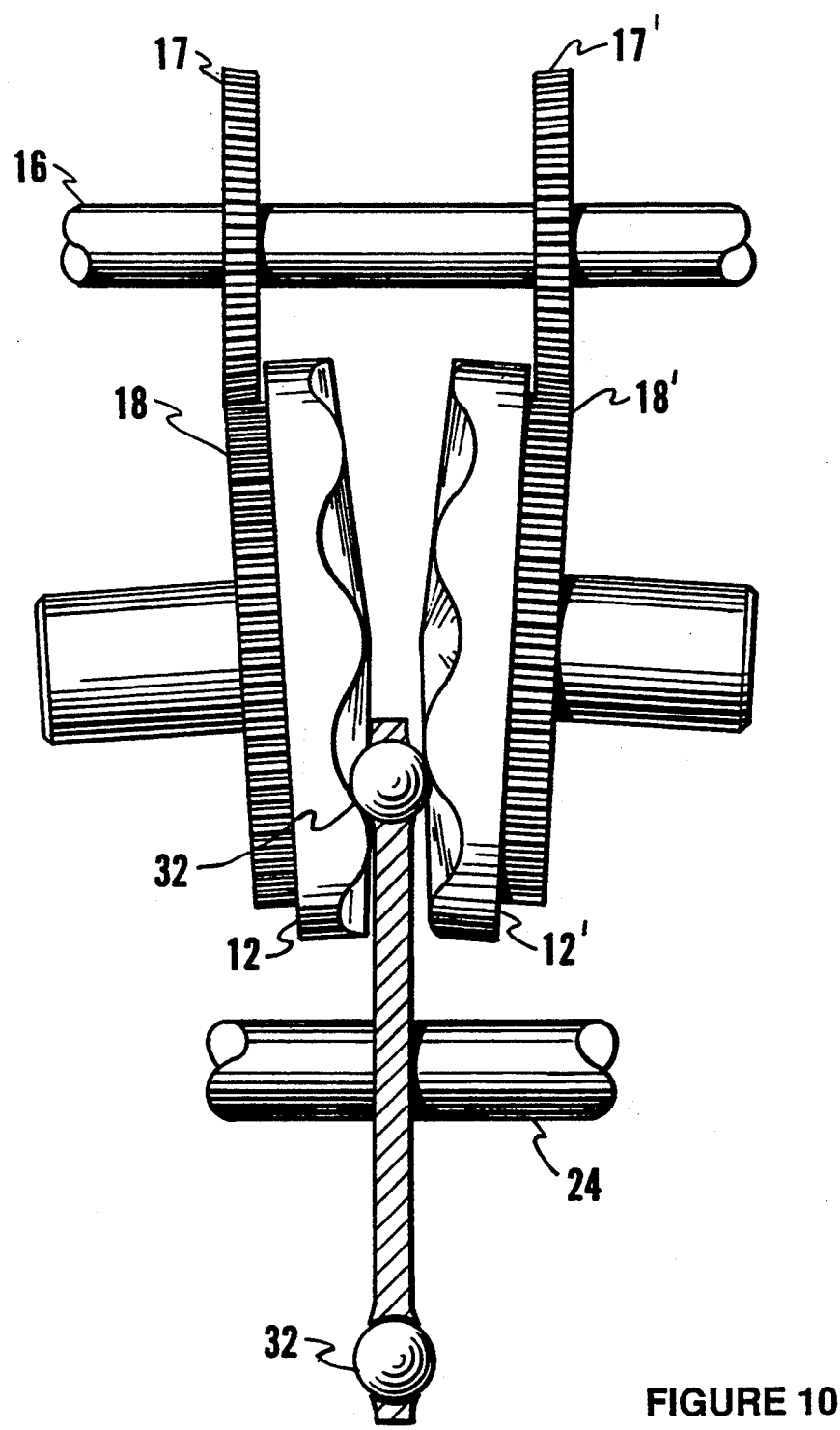
FIG. 10 is a detail drawing showing operation of a ball passing between mating beveled plates to illustrate operation of Applicant's invention.
Figure 11:
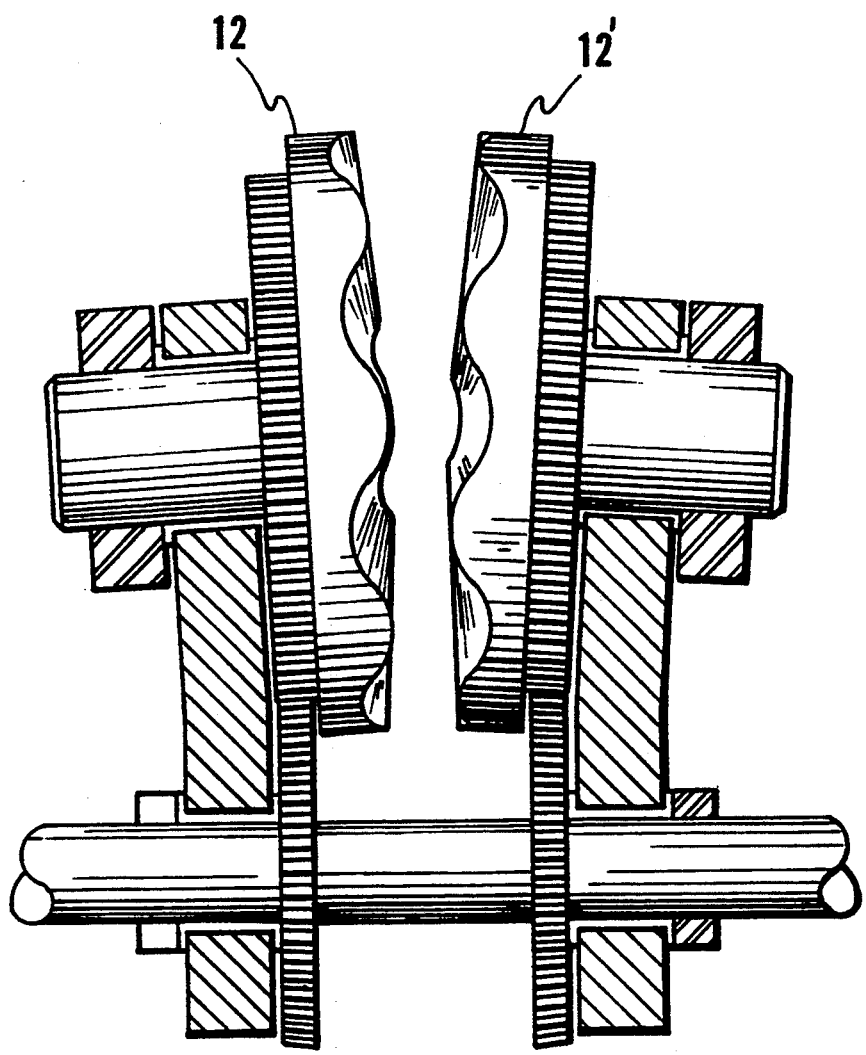
FIG. 11 further illustrates in detail the operation of Applicant's invention.

Considering sliding balls 32 illustrated in FIGS. 1(a) and 1(b) in a ball plate assembly 14, and in a ball chain assembly 38 in FIGS. 4, and 7. The balls 32 are illustrated as being slidable in FIGS. 8 from side to side between the mating plates 12 and 12', the crests 26 of the wave on plate 12 pushing the sliding ball 32 into the valley of the opposite mating plate 12' for locking said ball 32 as bevel plates 12 and 12' are turning is clearly illustrated in FIG. 10. This is also illustrated in some detail in FIG. 7 for a ball chain assembly 38 such as illustrated in FIG. 4. FIG. 8 basically illustrates how a ball in either assembly moves across the bevel plates position prior to being locked into some position on the radius between plates 12 and 12'. FIG. 9 illustrates how a ball chain such as shown in FIG. 4 mechanically moves balls 32 in an assembly across the bevel plates 12 and 12'. FIGS. 5, 6, and 11 show in detail how the bevel plates 12 and 12' are positioned to effect the forming of a funnel through the various sectors of the bevel plates 12 and 12' for the balls to slide into. As the plates 12 and 12' are rotating, the ball 32 is pushed into the valley 28 of the opposite mating plate 12' resulting in a momentary lock on the ball, in turn carry the ball plate 14 in the direction that bevel plates 12 and 12' are turning. Variation in the speeds between input 16 and output 24 shafts results when the sliding ball 32 which is capable of moving in and out at will, is put into a different radius of the bevel plates 12 and 12'. The bevel plates are set at angles to keep the beveled angle in parallel with its facing bevel plate assembly. Keeping the parallel edges at a preset distance from each other results in a funnel effect inward from the top to center and outwards from the center to bottom.

The bevel plates are connected through pinion gears to one shaft acting as one unit and the ball plate assembly to the other so that either shaft can become the input power shaft. The drive gears and the pinion gears are beveled to mate with connecting gears and the bevel plate assemblies are set at angles, one positive, the other negative. The balls are moved by its assembly moving in or out from the center of the beveled plates and changing the radius between the bevel plates 12 and 12' and the ball plate 14 varys the speed between the two power shafts. The distance from ball to ball being the same in the slide ball assembly, such as teeth on a gear or links of a chain, the distance from crest to crest in the beveled plates varies from center to the outer edge of the plates. Referring to FIG. 6 shows the bevel plates acting on a sliding ball 32 and pushing it off center of the centerline of the ball carrier. As the top and bottom of the bevel plates funnel away from the center and the plates are in different positions and how its action on the receiving balls and the exiting balls shows different distances between the wave crests relative to the position of the waves from the center of the bevel plates. It stands to reason that the longer or shorter the distance the ball is carried by the crests of the bevel plates 12 and 12', a difference in speed will result between the input shaft 16 and output shaft 24.

Although only one embodiment of Applicant's invention has been shown, it is expected that Applicant's invention will not be so limited and will only be limited by the scope and breadth of the annexed claims:

1. A positive, variable speed transmission system comprising input and output shafts, a pair of moveable mating beveled plates driven by said input shaft and having opposing surfaces with continuous concentric alternate crests and valleys extending away from the highs in the centers of the plates to the lows at the outer edge of the plates with the distance between crests and valleys being smaller at the centers of said plates and with the same depth of said crests and valleys maintained from the centers to the outer edge of said plates and a plurality of slidable balls in an assembly driven by said output shaft for movement between said plates, the position of said slidable balls determining the relative speed of one plate to the other.

2. A positive, variable speed transmission system as claimed in claim 1 wherein said plurality of slidable balls in an assembly comprises a ball chain assembly mechanically connected to said output shaft.

3. A positive, variable speed transmission system as claimed in claim 1 wherein said plurality of slidable balls in an assembly comprise a ball plate assembly mechanically connected to said output shaft.

4. A positive, variable speed transmission system as claimed in claim 1 wherein the area of said mating beveled plates comprises sectors which narrowly taper in the center and widen at the outer edge.

5. A positive, variable speed transmission system comprising input and output shafts, a pair of moveable mating beveled plates driven by said input shaft and having opposing surfaces with continuous concentric alternate crests and valleys extending away from the highs in the centers of the plates to the lows at the outer edge of the plates with the distance between crests and valleys being smaller at the centers of said plates and with the same depth of said crests and valleys maintained from the centers to the outer edge of said plates and a plurality of slidable balls in an assembly driven by said input shaft for movement between said plates, the position of said slidable balls determining the relative speed of one plate to the other.

* * * * *